United States Patent [19]

Hochmuth et al.

[11] Patent Number: 4,611,516
[45] Date of Patent: Sep. 16, 1986

[54] METAL WORKING CUTTING TOOL

[75] Inventors: Walter Hochmuth, Nuremberg; Hans-Peter Hollfelder, Fürth, both of Fed. Rep. of Germany

[73] Assignee: Zinner GmbH, Nuremberg, Fed. Rep. of Germany

[21] Appl. No.: 674,121

[22] Filed: Nov. 23, 1984

[30] Foreign Application Priority Data

Dec. 1, 1983 [DE] Fed. Rep. of Germany ....... 3343448

[51] Int. Cl.⁴ .................. B23B 3/26; B23B 29/034
[52] U.S. Cl. .................................. 82/1.2; 82/1.4; 407/77; 407/112; 407/113; 408/158; 408/161
[58] Field of Search ............... 408/158, 161; 407/112, 407/113, 77, 86, 87, 92, 98, 108; 82/1.2, 1.4

[56] References Cited

U.S. PATENT DOCUMENTS

| | | | |
|---|---|---|---|
| 2,150,561 | 3/1939 | Reaney | 407/112 |
| 3,530,745 | 9/1970 | Milewski | 408/158 |
| 3,754,309 | 8/1973 | Jones et al. | 407/113 |
| 3,987,524 | 10/1976 | Hochmuth et al. | 407/112 |
| 4,229,127 | 10/1980 | Bartley | 408/158 |
| 4,230,427 | 10/1980 | Beltiari et al. | 407/113 |
| 4,462,725 | 7/1984 | Satran et al. | 407/113 |
| 4,514,116 | 4/1985 | Kaminsky | 408/161 |

Primary Examiner—Francis S. Husar
Assistant Examiner—Jerry Kearns
Attorney, Agent, or Firm—Jordan and Hamburg

[57] ABSTRACT

Metal working cutting tool with a cutting insert which can be inserted in a recess of a tool shaft and fastened therein by means of a clamping jaw, whereby the cutting insert has the approximate shape of a prism with two diagonal opposite cutting edges and along one of the two lengthwise edges are adjacent cutting faces, which form an acute angle with the respective opposite principal cutting pressure and support surface, so that the angle opens towards the pressure-feed and support surface, whereby in the area of the joint lengthwise edge of the cutting face, there is incorporated in the cutting insert a continuous longitudinal groove of which one of the side walls serves as a support area for the relief-cut pressure-feed and support surface of the recess of the tool shaft, and whereas the respective other side wall forms the support surface for a recessed clamping jaw which is located in a diagonal groove of the tool shaft.

17 Claims, 19 Drawing Figures

METAL WORKING CUTTING TOOL

The invention relates to a metal working cutting tool with a cutting insert which can be inserted in a recess of a tool shaft, and which is fastened therein by a clamping jaw. The cutting insert has the approximate shape of a prism with two diagonally opposite cutting edges, and along one of the two longitudinal cutting edges are cutting faces which form with their corresponding opposite principal cutting pressure and support surface an acute angle facing the pressure-feed and support surface.

BACKGROUND OF THE INVENTION

Such a cutting tool, known from Federal Republic of Germany Offenlegungsschrift No. 30 37 576 has the advantage that the cutting insert can be manufactured simply, that it requires only a very small cutting insert volume and, furthermore, it allows for fastening of the cutting insert, which improves the machining process with respect to conventionally known metal working arrangements. In particular, the cutting insert of this cutting tool does not require complicated inclined engagement recesses for the clamping jaw, such as provided, for instance, in Federal Republic of Germany Offenlegungsschrift No. 25 09 226.

For a series of application cases, especially for boring tools, whereby usually the entire cutting edge is in fastening engagement, it is necessary that there are not provided any construction components, such as, for instance, clamping jaws, as indicated in DE-OS No. 30 37 576, because they would hinder the free machining process. The object of the present invention is, therefore, to provide an initially described tool such that, in addition to its advantages, it also ensures a further improved machining process.

According to the present invention, the object is attained whereby in the area of the joint longitudinal edge of the cutting face, there is provided a continuous groove extending over the entire length of the cutting insert, whereby one of its side walls serves as a contact surface for the relief-cut pressure-feed and support surface of the recess, and the corresponding other side wall forms the support area of a clamping jaw, and it is configured to be disposed in a diagonal groove of the tool shaft.

According to the invention, there is provided a groove in the cutting insert in order to achieve a recessed configuration with the clamping jaw. This groove, however, is configured much simpler than in the previously-known configurations. It is a simple continuous, for example, rectangular groove whereby, because of the reversibility, preferably this groove is configured symmetrical to the corresponding diagonal of the cutting insert.

The decisive difference between known reversible cutting inserts with an engagement groove for the clamping jaw, whereby the same engagement groove functions in both work positions of the cutting insert, and where the other one of the two side surfaces of the clamping jaw is acted upon only alternatingly, consists in that the cutting insert does not make contact in the area of the cutting face. In the cutting tool according to the invention, the pressure-feed and support surface of the tool shaft is instead configured relief-cut, so that an upper rib-shaped protruding section makes contact with the side wall of the groove of the cutting insert which is not needed as a support for the clamping jaw. Among others, this has the advantage that, independent of the size and the configuration of the machining guide stage, there is always present the same back pressure surface for jointly absorbing the cutting pressure.

In a further aspect of the invention, it is possible to provide that the clamping jaw almost completely fills the diagonal groove. Especially with longer cutting parts, it can also be provided that there are arranged several clamping jaws.

In contrast to known utilized cutting inserts with respect to the longitudinal axis of the cutting insert which are not inclined, a special advantage of the continuous groove according to the invention is that it permits the cutting insert to be clamped in any desirable longitudinal position in the recess of the tool shaft. With the help of one and the same cutting plate, it is thereby possible to achieve random fine tuning with respect to the cutting depth (in the case of boring tools) and to avoid having to manufacture exactly adjusted cutting inserts for certain finished dimensions. In order to avoid a sliding shifting of the position of the cutting insert caused by the cutting pressure, the back pressure and support surface of the cutting insert should make contact with an adjustment element. By means of shifting, the cutting insert is therefore adjusted in the recess of the tool shaft and is then clamped in the desired position by means of the clamping jaw.

Furthermore, the guidance-like configured plate lodgement also allows bringing the cutting insert into the smallest possible position, clamping it, and shifting it to the desired position via the adjustment element which can be configured as a release element. It is not necessary to again reclamp the clamping jaw. The principal cutting insert remains in its position during the shifting of the cutting plate. In order to assure this in each case, it is necessary that the pressure point of the adjustment element, preferably configured as a small-threaded adjustment screw, is positioned before the gripping point of the clamping element.

It has already been described above that especially for boring tools, preferably, the clamping or fitting groove is symmetrically configured. In the case of boring especially deep boreholes, the end-user wishes to use a tool having two or more cutting edges, in order to avoid running off center of the cutting tool, whereby the rough plate(s) is (are) running in an axial direction which, however, with respect to the subsequent finishing plate(s) cuts (cut) smaller in the radial direction. The subsequent finishing plate(s) finishes (finish) the bore diameter. In the standard case, axial and radial movements of 0.3 to 0.5 mm are sufficient between the turnplates. This kind of configuration can be achieved in this invention by means of providing different sized symmetrical clamping grooves, and also by means of inserting assymetrical clamping grooves without requiring any alteration of the support tool.

Further advantages, characteristics and features of the invention will be seen from the following description of several exemplified embodiments, as well as from the drawings which follow

BRIEF DESCRIPTION OF THE PREFERRED EMBODIMENTS

DESCRIPTION OF THE PREFERRED EMBODIMENTS

Figure 1:
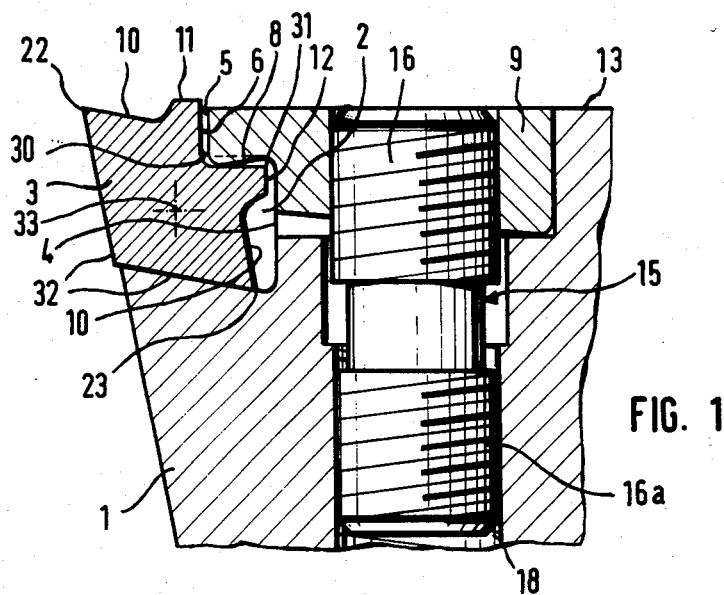
FIG. 1 is a cross-section of a cutting tool according to the invention taken along the line I—I in FIG. 2.

In a tool shaft 1, there is incorporated a three-sided open recess 2 for the insertion of a cutting insert 3, whereby the cutting insert 3 in its basic form essentially corresponds to the abovementioned Federal Republic of Germany Offenlegungsschrift No. 30 37 576. A pressure-feed and support surface 4 has a relief-cut configuration so that a rib 5 results, which makes contact with the side wall 6 of a continuous longitudinal groove 7 of the cutting insert 3, whereas a second side wall 8 of the longitudinal groove 7 of the cutting insert 3 is acted upon by a clamping jaw 9. Therefore, the remaining area of the cutting face 11 or 12 lying behind the chip formation slot 10 does not serve as pressure-feed and support surface 4 but rather the corresponding side surface of the lengthwise groove 7 which is not acted upon by the clamping jaw 9 serves as the pressure-feed and support surface. Thus it is possible to incorporate very large chip formation slots 10 in the cutting faces 11 and 12.

In the surface 13 of the tool shaft, there is provided a diagonal groove 14 for receiving the clamping jaw 9, whereby the clamping jaw 9 almost entirely fills in the diagonal groove 14 ending in the recess 2 for receiving the cutting insert 3. A thread bolt 15 or a clamping screw has an upper threaded section 16 engaging in a taphole 17 of the clamping jaw 9 and serves to clamp the clamping jaw 9, whereas a lower threaded section 16a of opposite threading is screwed into a taphole 18 in the tool shaft 1. By turning the threaded bolt 15 with respect to the lift motion, there therefore results a double lift of the adjustment of the clamping jaw 9.

Figure 5:
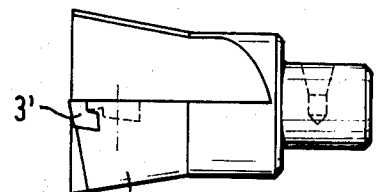
FIGS. 5 and 6 are side views of a boring tool having three cutting edges, seen from a line of view shifted by 90 degrees from each other.
Figure 6:
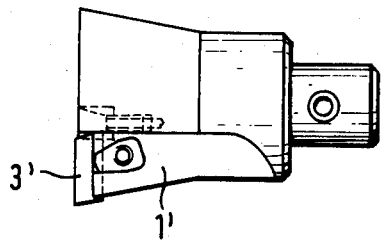
Figure 7:
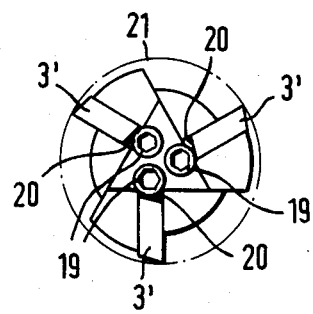
FIG. 7 is a frontal view of the boring tool according to FIGS. 5 and 6 with three cutting inserts mounted according to the invention.

The cutting tool according to the embodiment of the invention in FIGS. 1 to 4, wherein the corresponding cutting face of the cutting insert 3 (11 in the represented exemplified embodiment) is in working position, the surface of the clamping jaw 9 and the surface 13 of the tool shaft lie essentially in the same plane and wherein, furthermore, the cutting insert can be positioned lengthwise adjustably in the recess 2, is especially suitable for boring tools as is illustrated in FIGS. 5 to 7, wherein a boring tool has three cutting faces. Three cutting inserts are fastened on a tool head 1' configured like a boring head, at a spacing of 120 degrees, such as is indicated respectively in the case of a cutting insert in FIGS. 1 to 4. It is thereby essential that, in addition, an adjustment screw 19 is provided for each cutting insert 3'. Each adjustment screw 19 makes contact with the back pressure support surface 20. By means of this adjustment screw, the transcribed circle 21 shown in dash-dotted lines can be adjusted steplessly. As a result, this allows greater tolerances in the manufacture of the actual cutting inserts 3.

Figure 8:
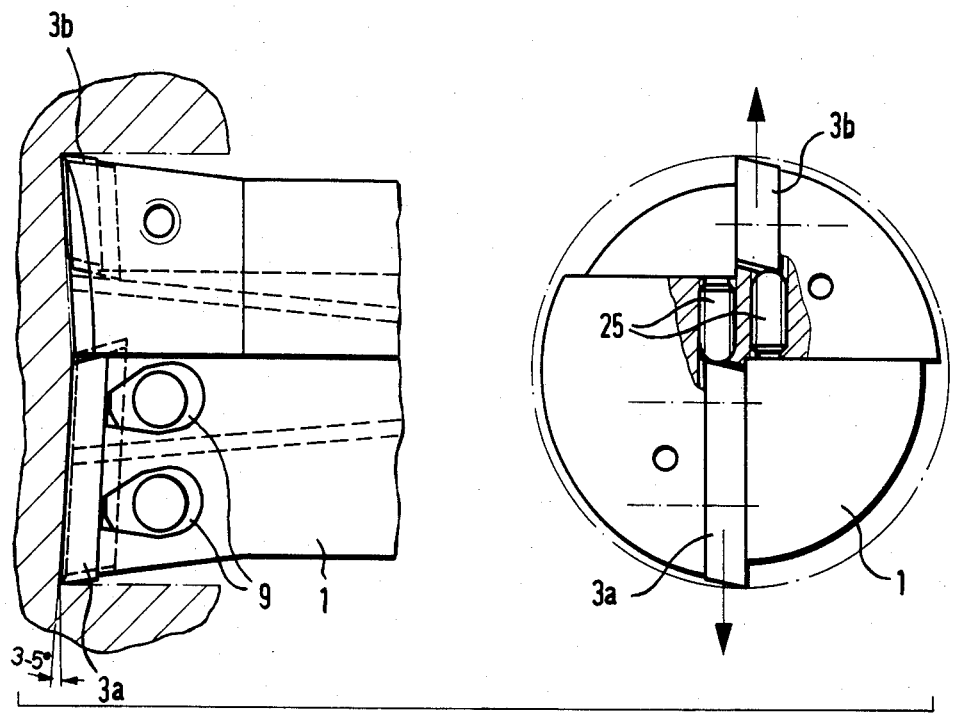
FIG. 8 shows a shallow-hole solid-bit boring tool viewed from the side, as well as a partially exposed frontal view.

FIG. 8 shows a shallow-hole solid-bit boring tool. The cutting edge of one of the cutting elements 3a is positioned over the center, whereas the second cutting edge of the cutting element 3b ends before the boring center. The leading cutting edges at an angle of 3 to 5 degrees, improve the automatic tool guidance, especially during the start of cutting. The cutting edges can be adjusted with respect to rotation towards each other and to a defined operating diameter via the adjusting screws 25.

Figure 9:
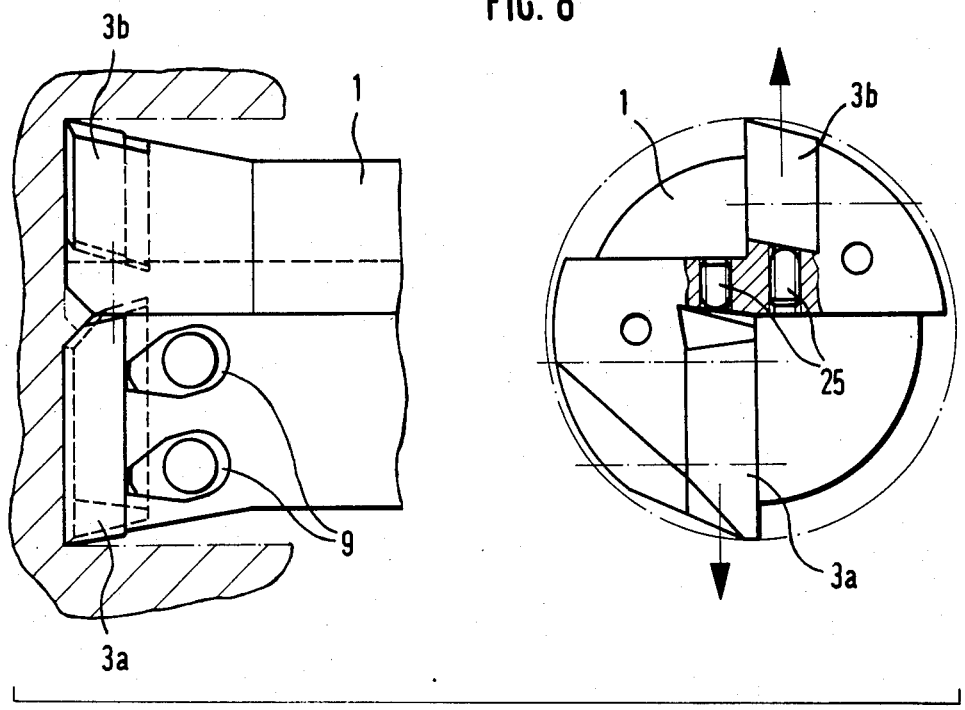
FIG. 9 shows a modified embodiment of a shallow-hole solid-bit boring tool according to FIG. 8 with perpendicular working ends.

FIG. 9 also shows a shallow-hole solid-bit boring tool wherein the tool, in this case, however, is provided with perpendicular working ends. The cutting edge of the cutting insert 3a extending over the center is provided with a center phase which takes over the tool guidance after the start of cutting. In comparison to FIG. 8, this embodiment has the advantage that in many processing cases, it does not require expensive after-treatment of the boring base.

Figure 10:
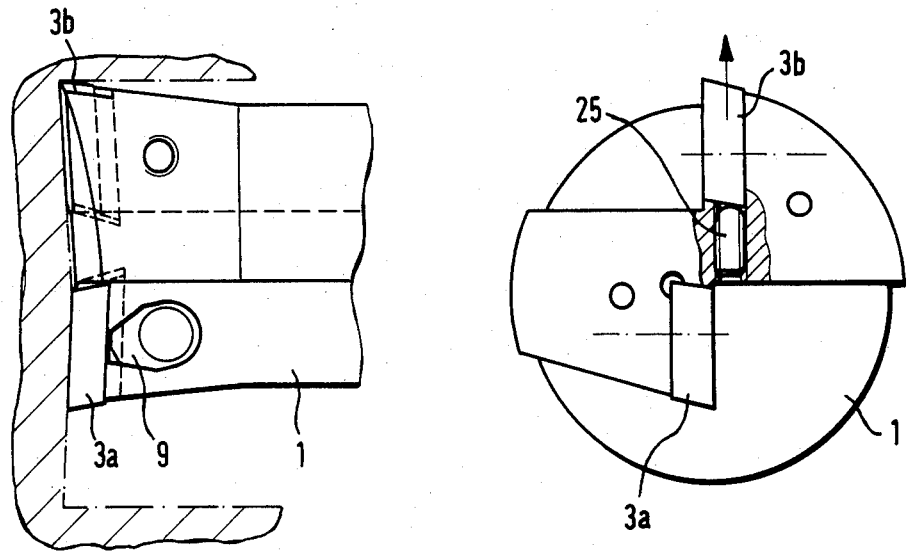
FIG. 10 shows the construction of a A "classic" shallow-hole solid-bit boring tool.

FIG. 10 shows the construction of a "classic" shallow-hole solid-bit boring tool. However, the working diameter is adjustably configured, in this embodiment, which differs from the known tools. This is accomplished with the help of adjustment screws 25. With reference to the exemplified embodiments of FIGS. 8 and 9, however, the guidance characteristics of this embodiment are inferior, and due to only one overlapping cutting edge, the metal working performance is lower.

Figure 11:
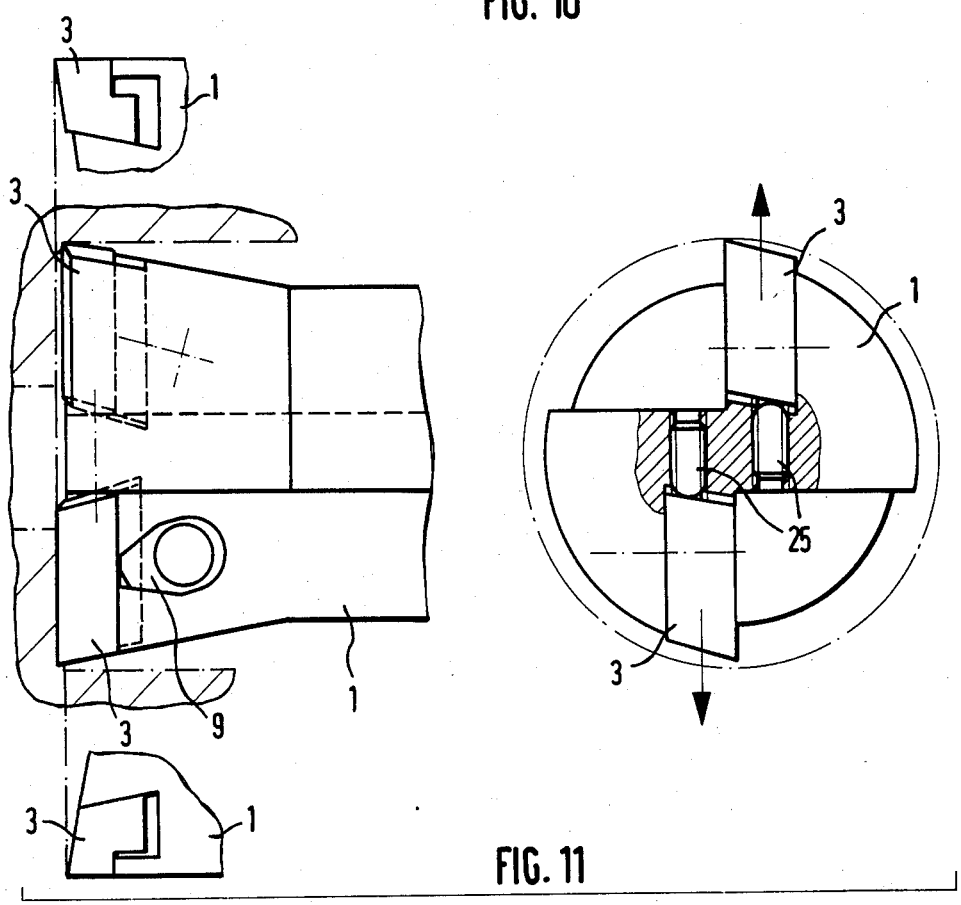
FIG. 11 shows a rough/finishing tool with assymetrical groove; right-hand cutting boring tool with interchangeable

In FIG. 11 is shown the already-mentioned rough/finishing tool of assymetric groove configuration. Depending on the construction of the turnplate 3, this tool can be used as a classic boring tool, for instance, having two axially opposite principal cutting edges. The radial increments and a defined intersection circle can be steplessly adjusted via the adjustment element 25.

Figure 12:
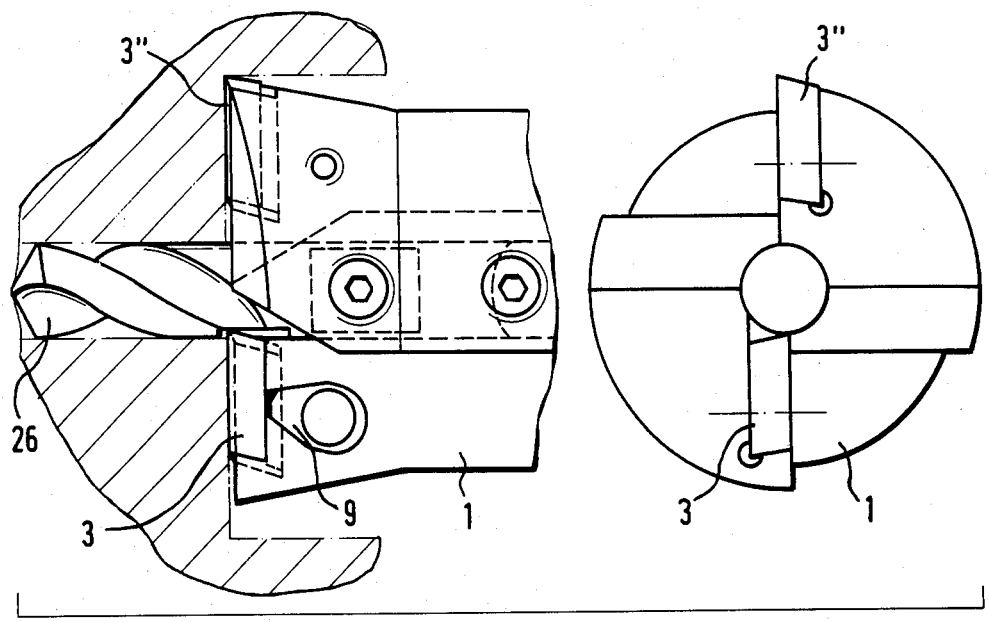
FIG. 12 shows a right-hand cutting boring tool with interchangeable spiral drill.

The "right-hand cutting" boring tool according to FIG. 12, with interchangeable spiral drill, could also function with a centering drill. In order not to weaken the center drill 26, in the center there is provided a right cutting plate 3, and the boring diameter is provided with a mirror-inverted (left) cutting plate 3".

Figure 13:
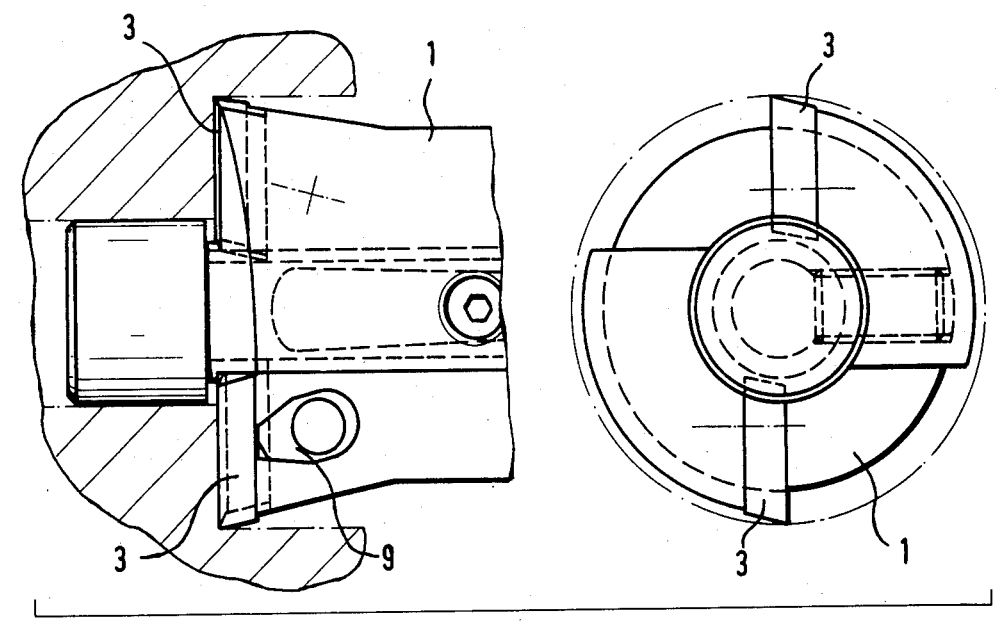
FIG. 13 shows cutter head with axially adjustable cutting edges.

A cutter head with axially adjustable cutting edges according to FIG. 13 is used when high surface qualities are required. At greater milling diameters, at the present, there are frequently used short clamping holders in the milling shaft which are adjusted via an adjustment mechanism. In the case of radial, small tools, however this known embodiment is too big. According to this embodiment of the invention, however, it is possible to achieve the required small construction without effort.

Figure 14:
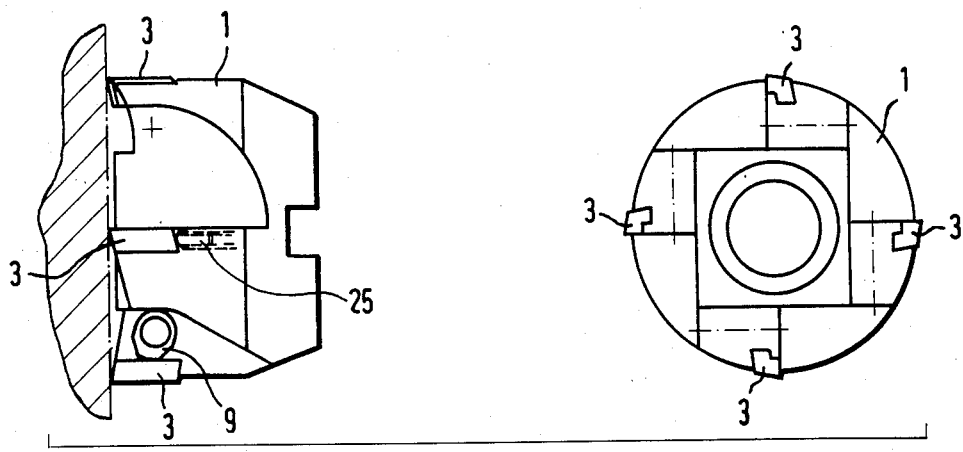
FIG. 14 shows a milling cutter.

FIG. 14 shows an embodiment of a milling cutter having cutting inserts mounted according to the invention, as is used, for instance, in the automobile industry, for applications where there is a very exactly executed impact lathe chuck. This requires that all the cutting edges engage simultaneously and equally strongly. According to the invention, this can be accomplished by means of the ability to shift the cutting inserts, whereby it is not only possible to make the shift very simply by means of an adjustment screw provided with small threading, but it can also be accomplished without loosening the clamping jaw 9. It has been shown that it is possible without problems to perform the lengthwise adjustment of the cutting inserts parallel to the cutting apparatus with the help of the adjustment screws 25 even with a sufficiently tightly fastened clamping jaw.

Figure 15:
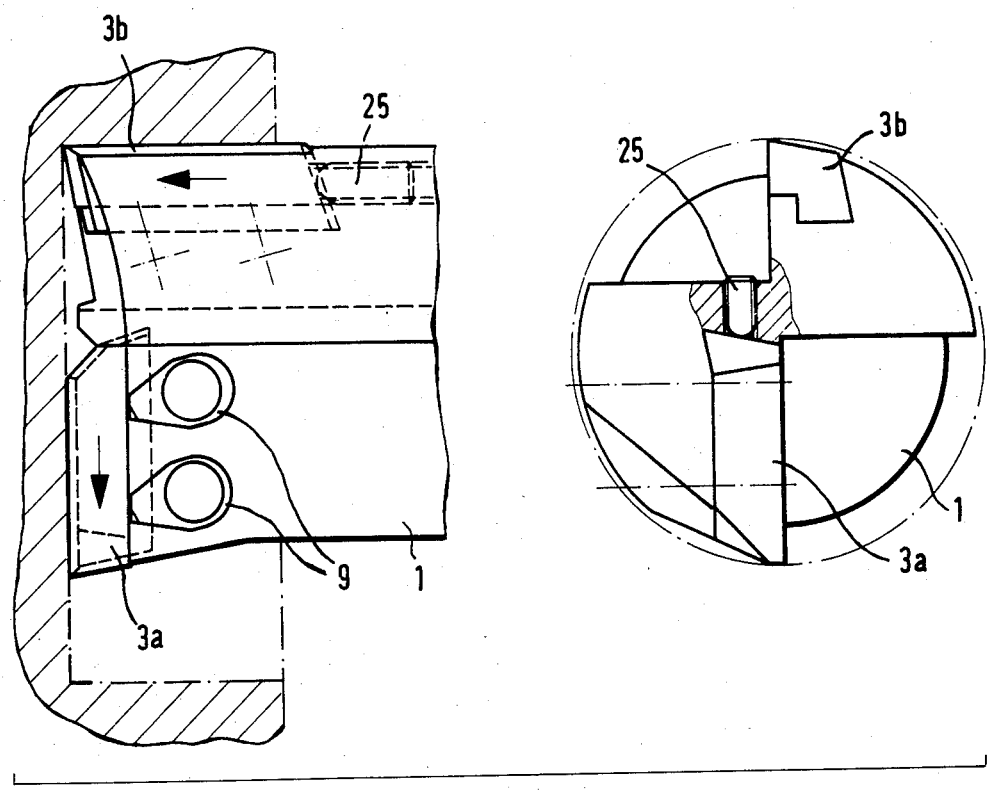
FIG. 15 shows an incremental groove milling cutter.

FIG. 15 shows an incremental slot milling cutter for axial and radial machining. It is provided with an axial cutting edge of center fixation, as has already been described in connection with FIG. 9 (cutting insert 3a). Decisive for a good machining performance is the fact that the corner radii of the plane edge of the cutting insert 3b and of the axial edge overlap and that they can be adjusted. The adjustment screws 25 are again provided for this purpose.

Figure 16:
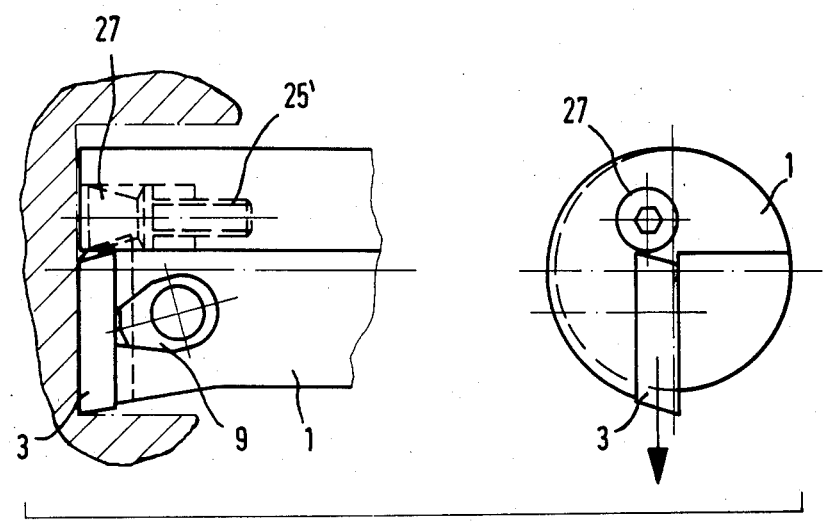
FIG. 16 shows a narrow-gauge drill.

FIG. 16 shows a narrow-gauge drill, for instance having a machining diameter of 10 mm, which, by means of the radial adjustment possibilities, can be used for spindling out a defined fitting diameter. Up until now, this is often performed with a spindling head, in which takes place the radial adjustment. The disadvantage of the conventional, relatively expensive solution is that, because of the center displacement of the spindling head, there takes place a relatively great mass displacement. Necessarily, the cutting speed has therefore to be reduced, which causes higher manufacturing costs. By means of rotating the adjustment element 25' provided with a conehead 27, simple and effective lengthwise adjustment of the cutting insert 3 is accomplished.

Figure 17:
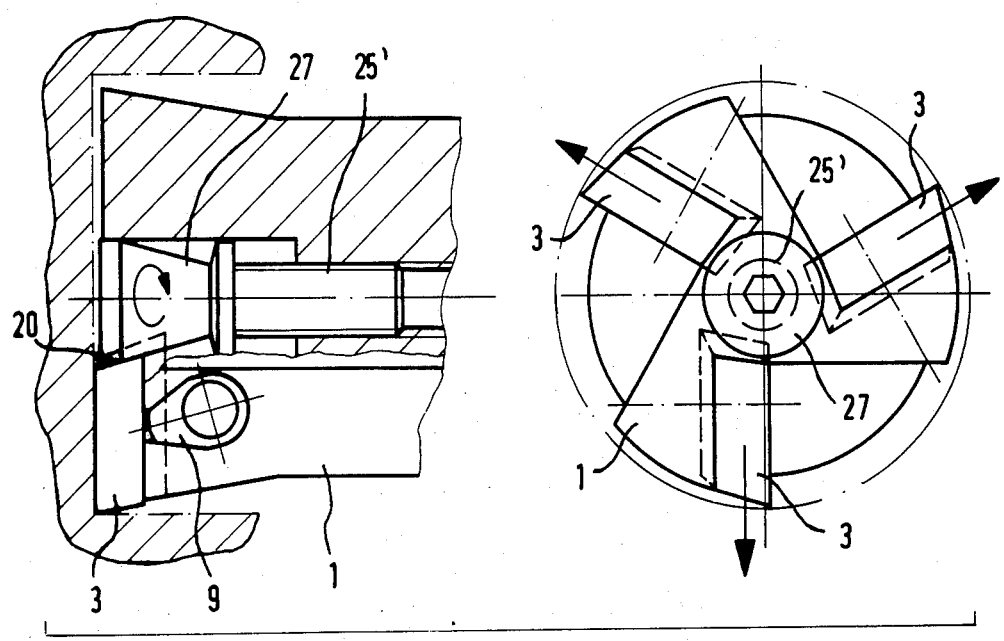
FIG. 17 shows a boring tool with three cutting edges.

FIG. 17 shows a three-edged boring tool, whereby all three cutting edges are adjusted via a central conescrew 25' having a conehead 27. Of course, it would be possible to construct in this way also a multi-edged boring tool having more than three cutting inserts.

Figure 18:
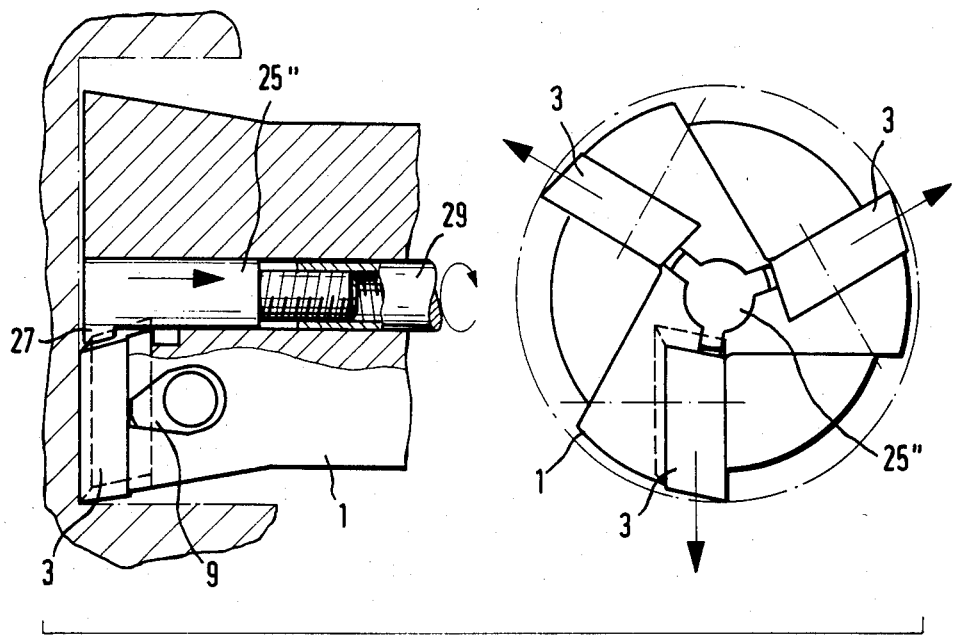
FIG. 18 shows another boring tool with three cutting edges with tie rod adjustment.

FIG. 18 also shows a three-edged boring tool whereby, in this case, however, the adjustment element is not configured as a conescrew, but as a tie rod 25'' having again a conehead 27. This basic principle allows automatic cutting edge compensation which would approximately function as follows. If it is determined, with the help of a measuring instrument, that the machining diameter is 0.10 mm too small, then, via given parameters (thread slope and tie rod angle), a computer calculates the necessary radial feed angle and controls a steeping motor which actuates the adjustment thread spindle 29. The necessary cutting corrections then take place via the tie rod.

Figure 19:
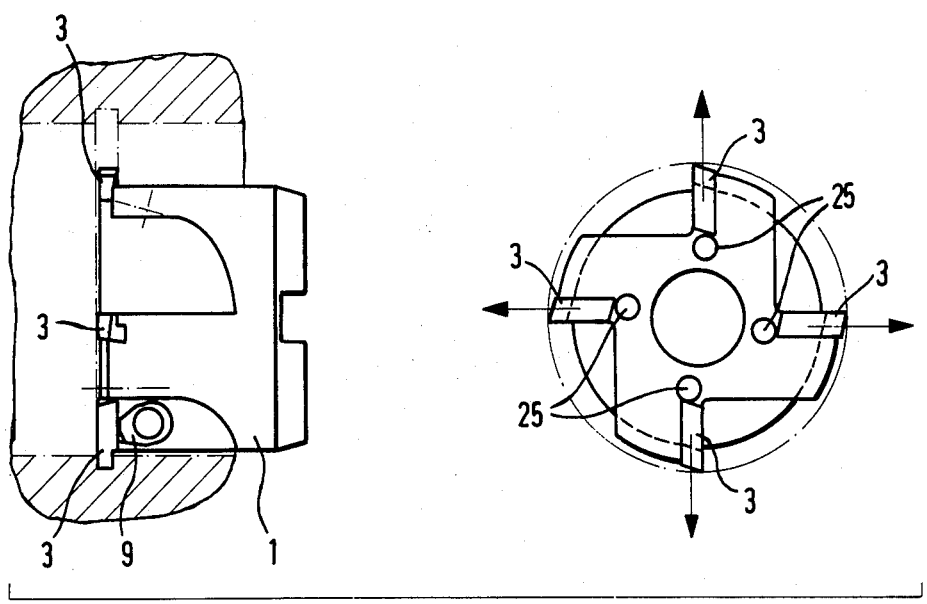
FIG. 19 shows a circular recessing milling cutter.

FIG. 19 shows a circular recessing milling cutter, whereby, by means of the radial adjustment elements 25, the cutting edges of all cutting inserts 3 can be brought on the same cutting circle. Thus a high machining performance and the formation of a very clean groove base is achieved. The represented embodiment according to FIG. 19 does not relate to a turnplate but to a cutting plate provided on one side with a recessing form.

Figure 2:
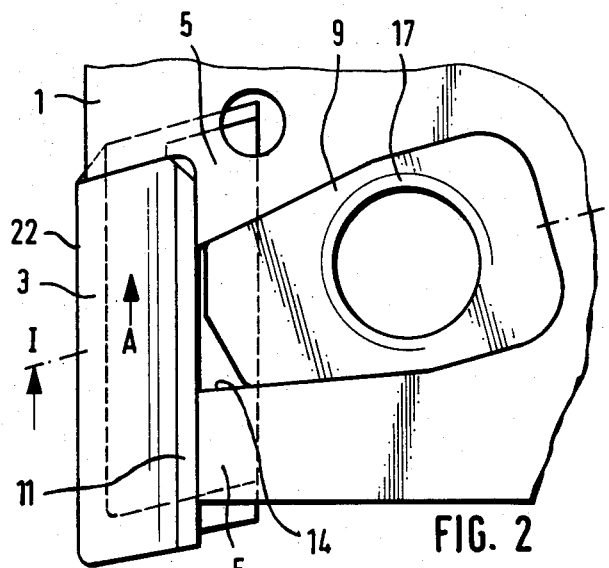
FIG. 2 is a view from the top of the cutting tool.
Figure 3:
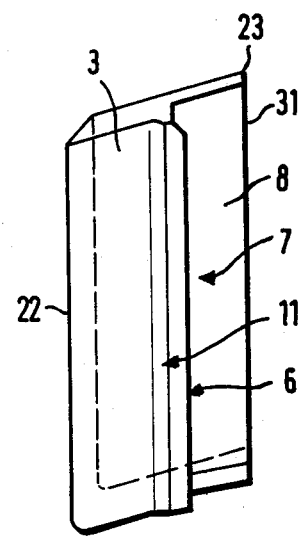
FIG. 3 is a view from the top of the cutting insert.
Figure 4:
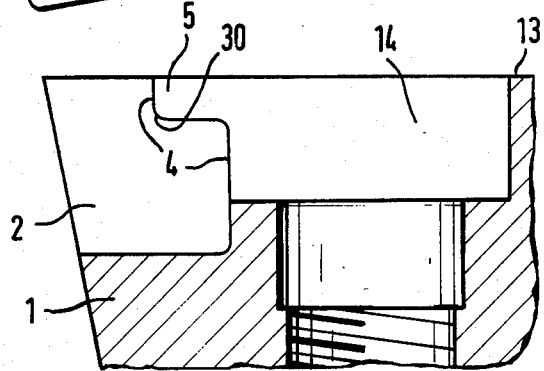
FIG. 4 is a cross-section essentially corresponding to FIG. 1, through the tool shaft without the cutting insert or the clamping element.

For an especially advantageous embodiment, it can be provided that the insertion of the cutting insert 3 is possible only in the direction of the arrow A of FIG. 2, i.e., essentially parallel to the longitudinal axis of the cutting part, as well as of its cutting edge. This results in that the distance between the edge 30 of the protruding rib 5 of the clamp and the opposite surface, on which is supported the cutting insert 3, is smaller than the distance between the edge 31 of the cutting insert and the cutting insert surface 32. This, in turn, results that even if the clamping jaw 9 is loosened, the cutting insert 3 cannot be pulled out towards the front, i.e., perpendicular to the direction of the arrow A of FIG. 2. Furthermore, as already disclosed above, it is also significant that the pressure point of the adjustment element 25 lies before the point of gripping of the clamping jaw 9, in order to prevent the cutting insert 3 from being pressed out towards the front, because of the operation of the adjustment element.

The invention is not limited to the represented exemplified embodiments. Particularly, if needed, it is possible to combine all the mentioned tool configurations and to complete them. Their common feature is that, because of the utilization of the clamping principle according to the invention, it is possible to create tools which, up to now, had not been constructed, or could only be constructed in much larger configurations.

We claim:

1. A metal working cutting tool comprising a tool mounting means having an open recess, said tool mounting means having a bottom wall along with an inner wall and a support wall with said support wall being spaced from said inner wall, said bottom wall, inner wall and support wall defining walls of said recess, a tool insert mounted in said recess, said tool insert being in the approximate shape of a prism and having two diagonally opposite cutting edges, each of said cutting edge being formed by a cutting face which is disposed at an acute angle with a principal support face, a longitudinal groove in said tool insert disposed at an inner end of said cutting faces, said groove having two side walls, a channel in said tool mounting means, clamping jaw mounted in said channel, said clamping jaw having an engaging surface clampingly engaging one of said side walls of said groove, said support wall of said tool mounting means engaging said other of said side walls of said groove, whereby the tool insert is held abuttingly by said support wall of said recess, said engaging surface of said clamping jaw, and said bottom wall of said recess.

2. A metal working cutting tool according to claim 1, wherein the other side wall of said groove is spaced from said clamping jaw.

3. A metal working cutting tool according to claim 2, wherein said clamping jaw has an outer terminating end which is spaced from said other of said side walls of said groove, said engaging surface of said clamping jaw extending from said terminating end.

4. A metal working cutting tool according to claim 1, wherein said recess has a generally U-shaped portion having two legs extending from a base, one of said legs being defined by said bottom wall of said recess, the other of said legs being defined by a projecting rib which projects from said inner wall of said recess, said base being defined by said inner wall of said recess.

5. A metal working cutting tool according to claim 4, wherein said projecting rib has a side wall spaced from said bottom wall of said recess, said projecting rib having a terminating end wall which defines said support wall which engages said other of said side walls of said groove.

6. A metal working cutting tool according to claim 5, wherein said side wall of said projecting rib has an outer end, said side walls of said groove each having an outer end, the distance between said outer end of said projecting rib and the opposite side of said bottom wall of said recess being less than the distance between the outer end of the side wall of said groove and the corresponding opposite principal support surface of said tool insert such that the tool insert cannot be removed from said recess in a direction perpendicular to the longitudinal axis of said tool insert.

7. A metal working cutting tool according to claim 1, wherein said bottom wall of said recess and said prinicipal support faces of said tool insert are generally planar surfaces.

8. A metal working cutting tool according to claim 7, wherein said principal support faces intersect one another at an obtuse angle.

9. A metal working cutting tool according to claim 1, wherein said tool insert extends longitudinally, said channel in said tool mounting being disposed diagonally relative to the longitudinal axis of said tool insert.

10. A metal working cutting tool according to claim 1, wherein said clamping jaw substantially fills the channel in said tool mounting.

11. A metal working cutting tool according to claim 1, wherein said cutting faces of said tool insert, the outer surface of said clamping jaw, and the outer surface of said tool mounting substantially lie in a common plane.

12. A metal working cutting tool according to claim 1, further comprising an adjustable element on said tool mounting engaging a pressure and support surface of said tool insert for adjusting the position of said tool insert on said tool mounting.

13. A metal working cutting tool according to claim 15, wherein an adjustable element engages the longitudinal end of said tool insert for adjusting the longitudinal position of said tool insert in said tool mounting.

14. A metal working cutting tool according to claim 1, wherein a plurality of said tool inserts are provided on said tool mounting, and a single adjusting means is provided for adjusting the position of said plurality of tool inserts in said tool mounting.

15. A metal working cutting tool according to claim 12, wherein said adjustable element comprises a cone-shaped element having a part threaded in said tool mounting, said cone-shaped element contacting said pressure and support surface of said tool insert.

16. A metal working cutting tool according to claim 12, wherein said adjustable element comprises a tie rod which is longitudinally movable to adjust the position of said tool insert in said tool mounting.

17. A metal working cutting tool according to claim 1, wherein said recess in said tool mounting and said tool insert are constructed with dimensions such that the tool insert can be inserted in said recess only parallel to the longitudinal axis of the tool inserts.

* * * * *